C. H. GEORGI.
AIRPLANE.
APPLICATION FILED MAR. 26, 1920.

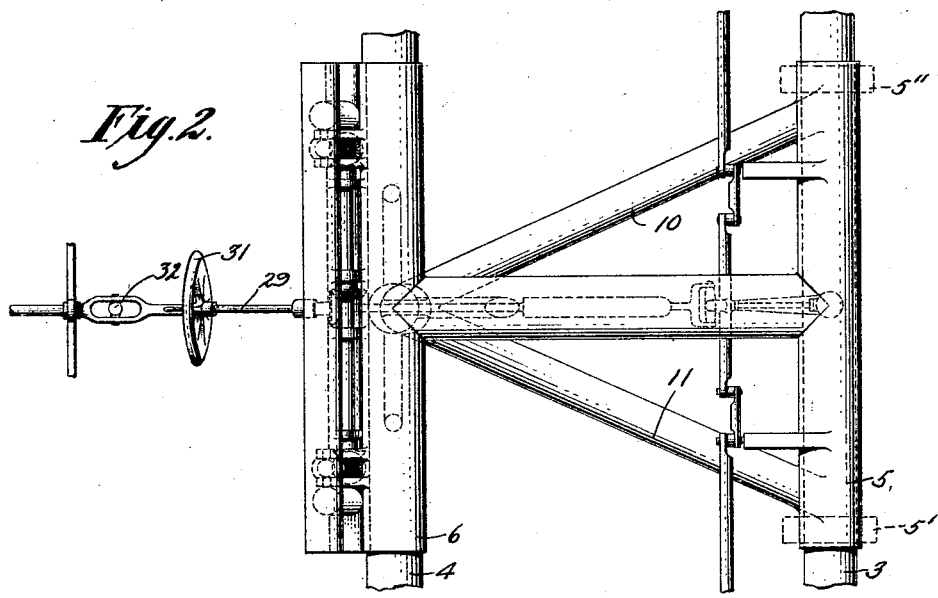
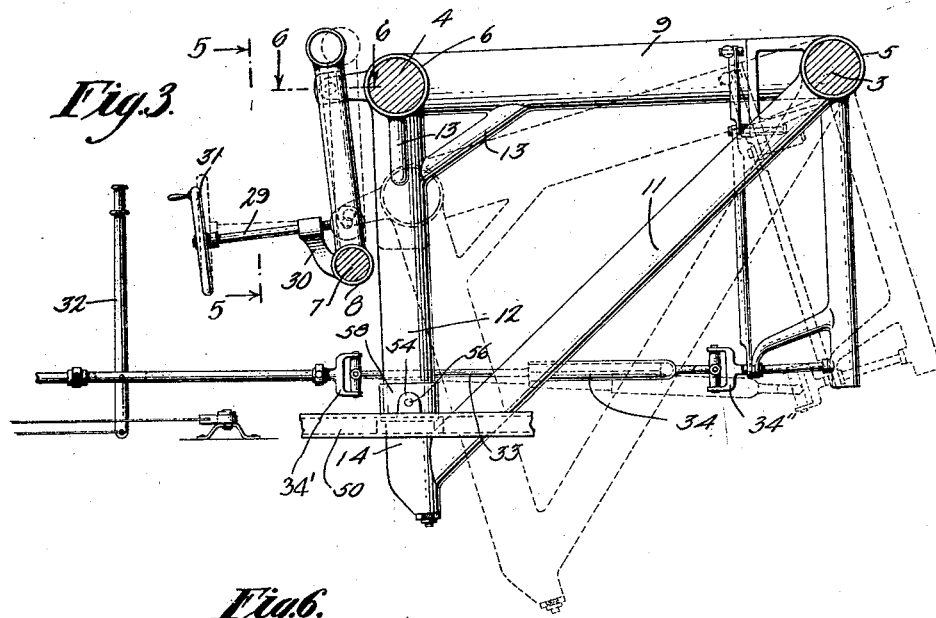
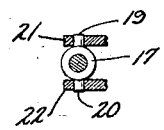

1,368,133. Patented Feb. 8, 1921.
3 SHEETS—SHEET 3.

WITNESSES:

INVENTOR
CARL H. GEORGI,
BY
ATTORNEYS

UNITED STATES PATENT OFFICE.

CARL H. GEORGI, OF NYACK, NEW YORK.

AIRPLANE.

1,368,133.      Specification of Letters Patent.      Patented Feb. 8, 1921.

Application filed March 26, 1920. Serial No. 369,123.

*To all whom it may concern:*

Be it known that I, CARL H. GEORGI, a citizen of the United States, and a resident of Nyack, in the county of Rockland and State of New York, have invented a new and useful Airplane, of which the following is a full, clear, and exact description.

This invention relates to airplanes, and particularly to an improved arrangement of planes and adjusting means therefor, and has for an object to provide a construction wherein the angle of incidence may be changed at any time.

Another object of the invention is to provide an improved construction of airplane wherein mechanism is provided for changing the angle of incidence at any time, the structure being so formed that none of the parts of the airplane are weakened or reduced in efficiency.

A further object is to provide means for swinging the planes of an airplane so as to vary their angle of incidence, whereby an easy landing may be made at a comparatively low speed by a high speed machine, and a bracing effect produced at the time of landing or while in flight.

In the accompanying drawings:

Figure 1 is a side view of a monoplane disclosing one embodiment of the invention.

Fig. 2 is a fragmentary top plan view of the center part of an airplane showing the principle parts of the invention.

Fig. 3 is a side view of the structure shown in Fig. 2.

Fig. 6 is a detail fragmentary sectional view through Fig. 3 on line 6—6.

Fig. 7 is a fragmentary perspective view showing a steadying device embodying certain features of the invention.

Figure 4:
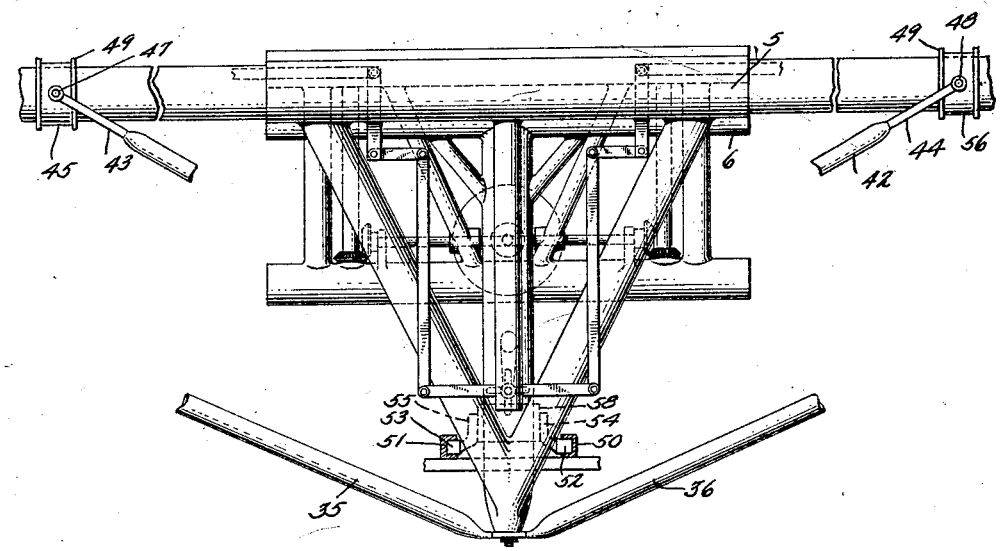
Fig. 4 is a front view of the construction shown in Fig. 2.
Figure 5:
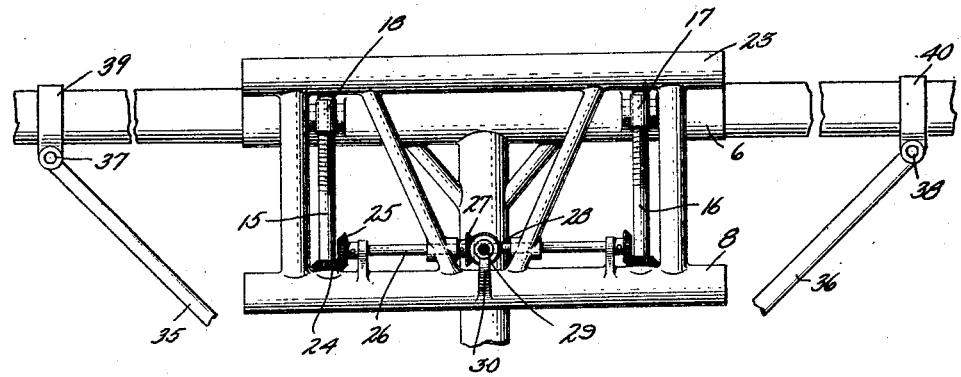
Fig. 5 is a fragmentary sectional view through Fig. 3 on line 5—5.

Referring to the accompanying drawings by numerals, 1 indicates a fuselage of a monoplane and 2 the lifting planes. The invention has been shown in respect to a monoplane, but it is understood that it may be quickly applied to airships having any number of planes with certain slight modifications.

In forming the airplane the front beam or spar 3 and also the rear beam or spar 4 may extend the full length of both planes, though this is not necessary. Preferably the wings are made in any usual or preferred manner and the spars 3 and 4 thereof are rigidly secured in any desired manner to the tubular members 5 and 6. The essential feature is to have the wings rigidly secured to the frame 14 so as to swing therewith, said frame being pivotally connected with the fuselage in any desired manner, as for instance by suitable fittings 5' and 5''. The fuselage 1 is connected or journaled in any suitable manner upon the tubular member 5 and is also rigidly secured to the beam 7 extending through tube 8 which is rotatably mounted thereon. The parts are arranged as hereinafter fully described so that the tube or sleeve 5 rotates in place while the tube 6 moves on the arc of a circle, the center of the arc being the center of the tube 5. The tubular member 6 is connected to tubular member 5 by a connecting member 9 formed of tubular metal if desired, while suitable bracing members 10 and 11 are connected with tubular member 5 and with one or more upright braces 12, said upright braces being rigidly connected in any suitable manner with tubular member 6 and braced thereto and also to member 9 by braces 13. By this construction and arrangement a rigid and strong adjusting frame is provided which is pivotally mounted on the fuselage and which holds in place the rear spar 4. If this frame is moved on its pivotal mounting, namely with the spar 3, the angle of incidence of the wings 2 will be varied. In providing a rigid adjusting frame of this type the strength and usual construction of the wings is not interfered with, while the desired result is secured, namely the variance of the angle of incidence for producing an easy landing at slow speed, or an easy get away when leaving the ground.

In order to hold the rigid frame 14, consisting of sleeves 5 and 6, connecting bars 9, 10, 11 and 12, and associate parts, any suitable structure may be provided which can be quickly and easily actuated either on the ground or in the air, and which will positively hold the parts in any adjusted position. One embodiment of the inventive idea is shown in the way of shifting means for the frame 14. This embodiment consists of a pair of screw members 15 and 16 threaded into traveling members or nuts 17 and 18, each of which have pintles 19 and 20 journaled in the ears 21 and 22 extending from pivotal movement thereof, runways 50 and 51 are provided (Fig. 7). These runways are preferably formed of metal and connected to the fuselage in any desired manner so as to be held rigidly in place. A pair of sliding blocks 52 and 53 are slidingly positioned in the runways 50 and 51, said blocks having upstanding ears 54 and 55 formed with apertures for receiving the pins 56 and 57 extending from the sleeve 58. Sleeve 58 is slidingly fitted on the upright section 12 and in such a manner as to permit a free sliding action, but no lost motion. The runways 50 and 51 are arranged longitudinally of the fuselage whereby the frame 14 may freely swing in a vertical plane and as it swings the blocks 52 and 53 slide back and forth and hold the frame against any lateral or twisting motion. In the drawing only one vertical upright section is shown, but it will be evident that any desired number could be provided. It is also evident that the arrangement shown in Fig. 7 could be provided for one or all of the uprights 12 if there are more than one.

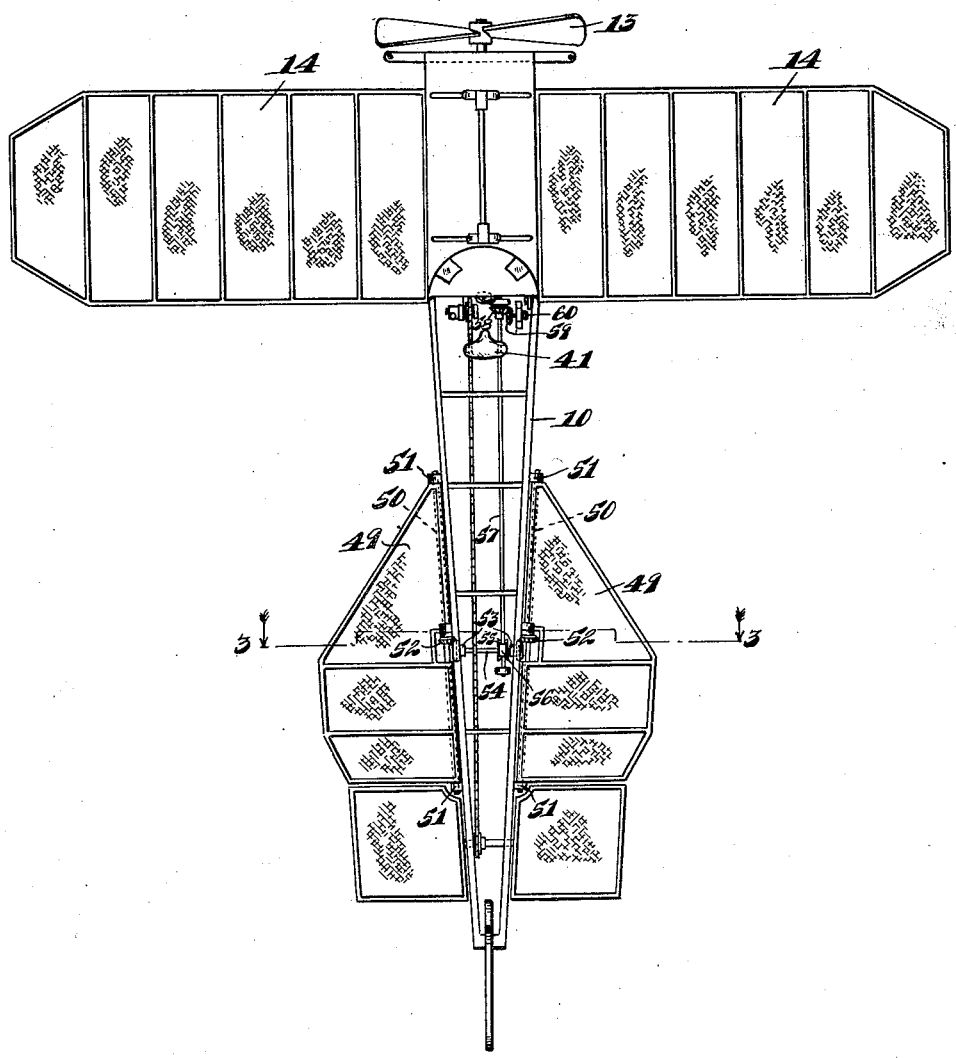

What I claim is:

1. In an airplane a fuselage, a plurality of wings, a centrally positioned frame rigidly secured to said wings, said frame being pivotally mounted on said fuselage, near the front spar of the wings, an auxiliary frame pivotally mounted on said fuselage adjacent the rear of the first mentioned frame, a pair of threaded rods mounted in said auxiliary frame, manually actuated means for rotating simultaneously said rods, a nut mounted on each of said rods, means for journaling said nuts on the rear part of said first mentioned frame whereby when said rods are rotated the first mentioned frame will be moved pivotally for varying the angle of incidence of said wings.

2. In an airplane a fuselage, a plurality of wings, a centrally positioned swinging frame connected with said wings so that when the frame swings the wings will also swing, a plurality of pairs of ears extending rearwardly from said frame, a nut arranged in each of said ears formed with journal members rotatably mounted in the ears, a threaded shaft fitted into each of said nuts, said threaded shafts extending substantially at right angles to the general direction of the fuselage, an auxiliary swinging frame carrying said threaded shafts, and hand operated means for rotating said shafts simultaneously in order to cause the nuts to move along the shafts and thereby swing the first mentioned frame and the wings connected thereto.

3. In an airplane, a fuselage, a plurality of lifting planes, said lifting planes being formed with a pair of wings having front and rear spars, said spars extending continuously from near one tip to near the opposite tip across the fuselage, said front spar being rotatably connected with said fuselage, and the rear spar movable on an arc around the front spar, a frame rigidly secured to both of said spars, and manually operable means connected with said frame for moving the same and swinging said wings on the arc of a circle for changing the angle of incidence of the wings.

4. In an airplane, a fuselage, a plurality of wings, a centrally positioned frame rigidly secured to said wings said frame being pivotally mounted on said fuselage near the front spar of the wings, means for swinging said frame and said wings so as to change the angle of incidence of said wings a pair of struts rigidly secured to said frame adjacent the rear therof and to the rear portion of said wings, a pair of struts rigidly connected with the fuselage and connected with the front beam of said wings in such a manner as to allow the beam to rotate while acting as bracing means therefor.

CARL H. GEORGI.